United States Patent [19]
Brown et al.

[11] Patent Number: 5,474,656
[45] Date of Patent: Dec. 12, 1995

[54] EQUAL LIFT SELF-LOADING CONTROLLED DEFLECTION ROLL AND METHOD FOR OPERATING SAME

[75] Inventors: Dale A. Brown, Milton, Wis.; Arnold J. Roerig, Gold Canyon, Ariz.

[73] Assignee: Beloit Technologies, Inc., Wilmington, Del.

[21] Appl. No.: 290,317

[22] Filed: Aug. 15, 1994

[51] Int. Cl.$^6$ .................. D21F 3/08; B21B 27/00
[52] U.S. Cl. ................ 162/272; 162/281; 162/300; 162/352; 492/7; 492/20
[58] Field of Search ............. 162/272, 281, 162/300, 352; 492/5, 7, 46, 20, 6; 100/162

[56] References Cited

U.S. PATENT DOCUMENTS

| | | | |
|---|---|---|---|
| 3,997,952 | 12/1976 | Lehmann et al. | 29/115 |
| 4,334,344 | 6/1982 | Biondetti | 29/116 |
| 4,827,584 | 5/1989 | Pav et al. | 29/116 |
| 4,850,088 | 7/1989 | Speak | 29/116.2 |
| 4,891,874 | 1/1990 | Roerig et al. | 29/115 |
| 4,970,767 | 11/1990 | Link | 29/116.2 |
| 5,060,357 | 10/1991 | Roerig et al. | 29/113.2 |
| 5,111,563 | 5/1992 | Brown et al. | 29/116 |
| 5,127,141 | 7/1992 | Roerig et al. | 29/116 |
| 5,193,258 | 3/1993 | Brown | 492/7 |

*Primary Examiner*—David L. Lacey
*Assistant Examiner*—Calvin Padgett
*Attorney, Agent, or Firm*—Dirk J. Veneman; Raymond W. Campbell; Gerald A. Mathews

[57] ABSTRACT

A self-loading controlled deflection roll has movable shoes disposed inside the roll shell, at the opposite ends and at the center of a central shaft, for displacing the external surface of the roll shell toward and away from a mating roll forming a nip with the controlled deflection roll. In order to ensure that both ends of the controlled deflection roll shell move evenly in a radial direction into nipping engagement with the mating roll, and to also ensure that the ends retract evenly away from nip engagement, a control system and method are provided for automatically adjusting the flow of hydraulic fluid, such as oil, which is used to displace the shoes at the opposite end of the central shaft. The control system and method make use of a mechanical linkage which is operated by movement responsive displacement of the shoes, the linkage positioning relatively movable parts of a control valve so as to increase or decrease the flow of hydraulic fluid to the respective end shoes, thereby ensuring that the end shoes move uniformly relative to each other.

14 Claims, 3 Drawing Sheets

EQUAL LIFT SELF-LOADING CONTROLLED DEFLECTION ROLL AND METHOD FOR OPERATING SAME

BACKGROUND OF THE INVENTION

1. Field of the Invention

The present invention is related to a self-loading type of controlled deflection roll, as is used in the papermaking industry, which forms one roll in a pair of nipped rolls for processing a traveling web of paper.

2. Description of the Prior Art

Pairs of rolls forming a nip through which a traveling web passes are used at many locations in a papermaking machine, particularly in the press section to mechanically remove water from the web. In such nips, one or both rolls are loaded, i.e., the roll is mechanically forced toward the nip in order to exert a desired amount of pressure on the web as it travels through the nip. It is also necessary to be able to mechanically retract the rolls of a nip away from each other, so as to open the nip. Such retraction is necessary not only to be able to control the nip pressure, but also as part of the start-up procedure for the papermaking machine either at the beginning of a new production run, or after a sheet break. The start-up procedure involves the cutting and threading of a "tail" through the machine. The papermachine is usually, but not always, threaded at or near operating speed. The speed may be increased or decreased during operation, after threading. During this start-up procedure, a nip will not be loaded at its normal operating pressure. For many years in the papermaking industry, loading of rolls was accomplished by suitable mechanisms disposed at one or both ends of the roll shaft about which the roll rotates. Such mechanisms moved the entire roll on its shaft toward and away from the mating roll in the nip.

In order to provide uniform processing of the entire width of the web in the cross-machine direction as it travels through a nip, it is desirable to have the line of contact between the two rolls forming the nip be as straight as possible or, if one of the rolls has a contour which is not a straight line, to have the other roll follow that contour as closely as possible. As improving technology in the papermaking industry permitted papermaking machines to be made increasingly wider in the cross-machine direction, as well as to operate at increasingly faster speeds, the sheer weight of the roll or the roll shell, supported only at its opposite ends, resulted in a slight "sag" of the roll in a central region of the nip, thereby causing the line of contact between the two rolls in a nip to exhibit a non-uniform distance between the rolls along the cross-machine direction.

Controlled deflection rolls were developed in response to this problem. The first generation of such controlled deflection rolls were intentionally loaded at their opposite ends so as to cause the roll shell to exhibit a slight outward bow in opposition to the aforementioned sag, so that the distance between the two rolls in the nip would be uniform along the entire cross-machine width of the nip.

More recently, so-called self-loading controlled deflection rolls have been developed, wherein a number of hydraulically operated shoes are carried on a center shaft disposed inside the roll shell, the shoes being actuatable to move toward and away from the axis of rotation of the roll, so as to push against the inner surface of the roll shell, thereby achieving the desired deflection of the outer surface of the roll shell. The need to provide complicated mechanisms at the opposite ends of the roll to move the roll toward and away from the nip is thereby avoided, and only mechanisms for rotating the roll need to be provided at one or both ends, typically only at one end. Examples of such self-loading controlled deflection rolls are disclosed in U.S. Pat. Nos. 5,193,258, 5,127,141 and 5,111,563.

Such self-loading controlled deflection rolls typically have a hydraulically operated center shoe disposed at a central region of a support shaft extending through in the interior of the roll shell, as well as front and back shoes respectively disposed at the front end and the back end of the shaft inside of the shell. The shoes are moved radially outwardly and inwardly (relative to the rotational axis of the roll) by means of hydraulic fluid, such as oil, which is delivered through the central shaft to the shoes. Typically, delivery of the hydraulic fluid to the shoes at the opposite ends of the roll takes place by means of a conduit system supplied from a source of hydraulic fluid at one end of the roll. This means that one shoe will be closer to the source of hydraulic fluid than the other shoe, with a hydraulic fluid line running between the shoes. As a result of the unavoidable pressure differential which is present in the hydraulic line running between the shoes, as well as due to other factors, the pressure exerted by the hydraulic fluid on one of the front or back shoes will be slightly different from the pressure exerted by the hydraulic fluid at the other shoe at the opposite end of the roll, thereby causing the shoes to be displaced by respectively different amounts, and thereby causing uneven radial movement of the roll shell. Such uneven radial movement is undesirable because nip engagement is then non-uniform, which can lead to threading problems and sheet breaks. Moreover, if one end of the shell is radially displaced by a different amount from the other end, this results in the shell being out of parallel with the center shaft axis. This causes the internal portions of the shoes to become misaligned within the center shaft piston groove in which they move. For the purpose of accommodating such misalignment, conventional self-loading controlled deflection rolls employ end dam seals. Such misalignment also results in the rotary oil seals and other internal parts being subjected to misalignment as well, which increases the wear to which all of these parts are subjected, and thus decreases the useful life of those parts. Papermaking machines are such a large investment that, ideally, a mill operator would like to operate the machines in a manner as closely approaching continuous operation as is possible, with down time being maintained to a minimum. To the extent that the above-mentioned misalignment problems can be avoided, or minimized, and thus reduce the wear on the parts, and if such misalignment can be minimized or avoided without significantly adding to the complexity of the roll structure, down time will be similarly reduced, thereby increasing the profits of the mill operator.

Position sensors can be placed at suitable locations within the roll so as to detect misalignment when it occurs, however, such position sensors, and the associated control circuitry, are costly, and require frequent maintenance and adjustment, and therefore even though they may reduce the wear on the parts and thus reduce the down time associated with replacement of those parts, the position sensors and control circuitry themselves have a certain amount of down time associated therewith and are thus not an optimum solution. Alternatively, separate hydraulic delivery systems could be respectively provided for each of the end shoes, however, this would involve a duplication of equipment, and would also require means for ensuring that the flow in each delivery system was identical.

SUMMARY OF THE INVENTION

It is an object of the present invention to provide a hydraulic fluid delivery system for a self-loading controlled deflection roll which has a simple structure and thus does not significantly increase the complexity of the overall roll structure, and which automatically maintains a balance between the fluid delivery to the respective shoes at the opposite ends of the roll so as to achieve uniform radial movement of the shoes, and thus uniform radial movement of the roll shell.

The above object is achieved in accordance with the principles of the present invention in a method and apparatus wherein a self-loading controlled deflection roll is provided with internal mechanical means extending between the roll ends and responsive to movements of the front and back shoes, which operates a control valve that automatically compensates the oil supply to the respective end shoes, thereby causing the radial movement to be uniform at both ends of the roll.

The method of the invention includes the steps of regulating the oil supply to one of the front or back shoes using a control valve having relatively movable control valve parts, mechanically linking one of the control valve parts to one of the front or back shoes so that the control valve part is moved by an amount corresponding to displacement of the shoe, mechanically linking the other control valve part to the other of the front or back shoes so that control valve part is moved by an amount corresponding to displacement of the other of said front or back shoes, and regulating the flow of hydraulic fluid through the control valve to the controlled shoe by the relative positions of the control valve parts, as respectively moved by displacement of the front and back shoes.

In a preferred embodiment of the apparatus of the invention, the mechanical means includes a cross shaft which is connected to the bearing ring, which is already present in the self-loading roll, by a link connected by a pin to a torque arm attached to the cross shaft. Such a linkage is preferably present at the back end of the roll. The cross shaft extends to the front end of the roll where it is connected to a rotary control valve. The valve is free to rotate on the cross shaft, and is connected to the front bearing ring by a similar link connected by a pin to a torque arm attached to the control valve. The control valve has two oil passages extending radially through the valve. One passage controls the oil flow to the front shoe for lifting, and the other passage controls the oil flow from the front shoe for lowering. The particular flow passage which is employed at any given time is governed by check valves. The end of the cross shaft which engages the control valve has two holes therein in registry with the openings in the control valve. The oil flow through the passage currently in use is governed by the relative rotary position of the hole in the cross shaft, extending between the openings in the control valve. If the front shoe begins to be lifted faster than the back shoe, for example, the oil supply to the front shoe will be restricted by the relative position of the control valve. By contrast, if the back shoe begins to lift faster than the front shoe, the oil supply to the front shoe will be increased by the relative position of the control valve.

This system thereby provides a self-loading controlled deflection roll with a uniform lift at the front and back ends. The system is self-contained inside the roll, and does not require any external components. Moreover, the system can be connected to existing, standard hydraulic fluid delivery means which are currently in place in most mills, or are commercially available.

DESCRIPTION OF THE PREFERRED EMBODIMENTS

Figure 1:
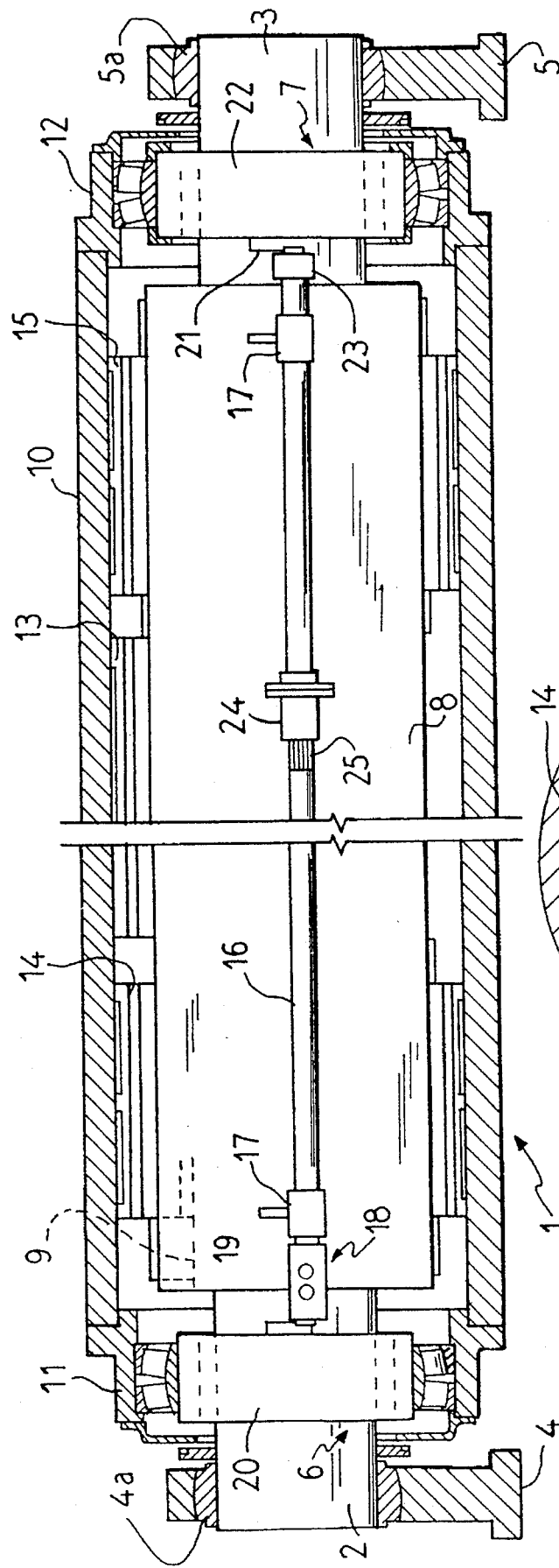
FIG. 1 is a side elevational view of a self-loading controlled deflection roll, partially in section, constructed and operating in accordance with the principles of the present invention.

An exemplary embodiment of a self-loading controlled deflection roll 1 constructed in accordance with the principles of the present invention is shown in FIG. 1. The roll 1 has a center shaft 8 with stub arbors 2 and 3 at opposite ends thereof. The stub arbor 2 is received in a spherical bearing 4a of a front mounting stand 4, and the stub arbor 3 is received in a spherical bearing 5a of a back mounting stand 5. The roll 1 has a hollow, cylindrical roll shell 10 with a flange 11 at one end thereof and a flange 12 at the opposite end thereof. The flange 11 accommodates a front bearing assembly 6 which includes, among other components, a front bearing ring 20. Similarly, the flange 12 accommodates a back bearing assembly 7 which includes, among other components, a back bearing ring 22. The roll 1 is made rotatable by means of the bearing assemblies 6 and 7. Further details of the bearing assemblies are omitted for simplicity, however, the bearing assemblies 6 and 7 can be constructed in any suitable known manner, such as disclosed in U.S. Pat. No. 5,193,258 or U.S. Pat. No. 5,127,141, the teachings of both of those patents being incorporated herein by reference.

The roll 1 shown in the example of FIG. 1 is a non-driven roll, which means it is not actively driven by its own drive mechanism, but is rotated by contact with the mating roll (not shown) which forms a nip with the roll 1. The inventive concept disclosed herein, however, can be used to equal advantage in a driven roll. If desired, therefore, the roll 1 can be provided with a drive mechanism of the type described, for example, in U.S. Pat. No. 5,193,258.

The center shaft 8 has a piston channel 9 which receives the respective lower portions of a center shoe 13, a front shoe 14 and a back shoe 15. These shoes are hydraulically operated by a system for delivering hydraulic fluid, such as an oil delivery system, described in more detail in connection with FIG. 3. The shoes 13, 14 and 15 are actuatable by the oil delivery system to move toward and away from the inner surface of the roll shell 10, and therefore are capable of deforming the outer surface of the roll shell 10 so as to give that outer surface a desired contour.

Figure 2:
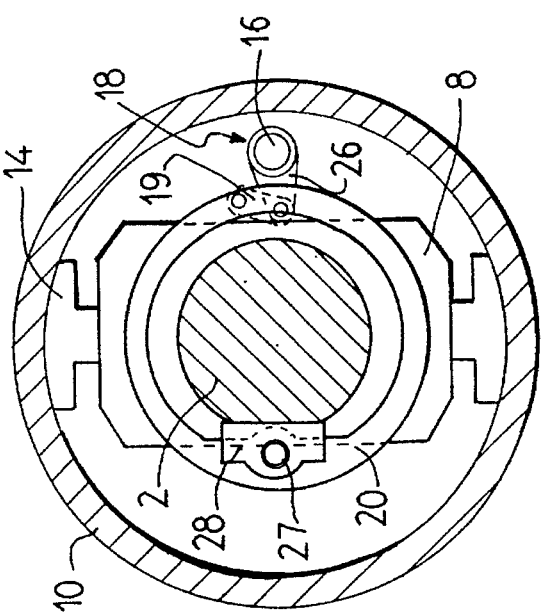
FIG. 2 is an end elevational view of the roll of FIG. 1, with certain components being omitted for simplification.

An end view of the front shoe 14, and associated components, is shown in FIG. 2, with certain components omitted for clarity. As described in the aforementioned U.S. Pat. Nos. 5, 193,258, 5,127,141, and 5,111,563 (the teachings of the last patent also being incorporated herein by reference), when the shoe 14 is displaced by the action of the hydraulic fluid toward or away from the roll shell 10, this causes a displacement of the roll shell 10 relative to the stub arbor 2. The stub arbor 2 is connected to the front bearing ring 20 by means of a mount 28 attached to the stub arbor 2 which receives a pin 27 extending through the mount 28 and through an opening in the side of the front bearing ring 20. Thus, when the front shoe 14 is displaced toward or away from the roll shell 10, the front bearing ring 20 exhibits rotational motion in one of the two directions indicated by the curved double arrow shown in FIG. 3. An identical arrangement (not shown) connects the back bearing ring 22 to the stub arbor 3, and thus the back bearing ring 22 is caused to rotate in one of the two directions indicated by the double arrow next to the back bearing ring 22, when the back bearing shoe 15 is displaced toward or away from the roll shell 10.

Figure 4:
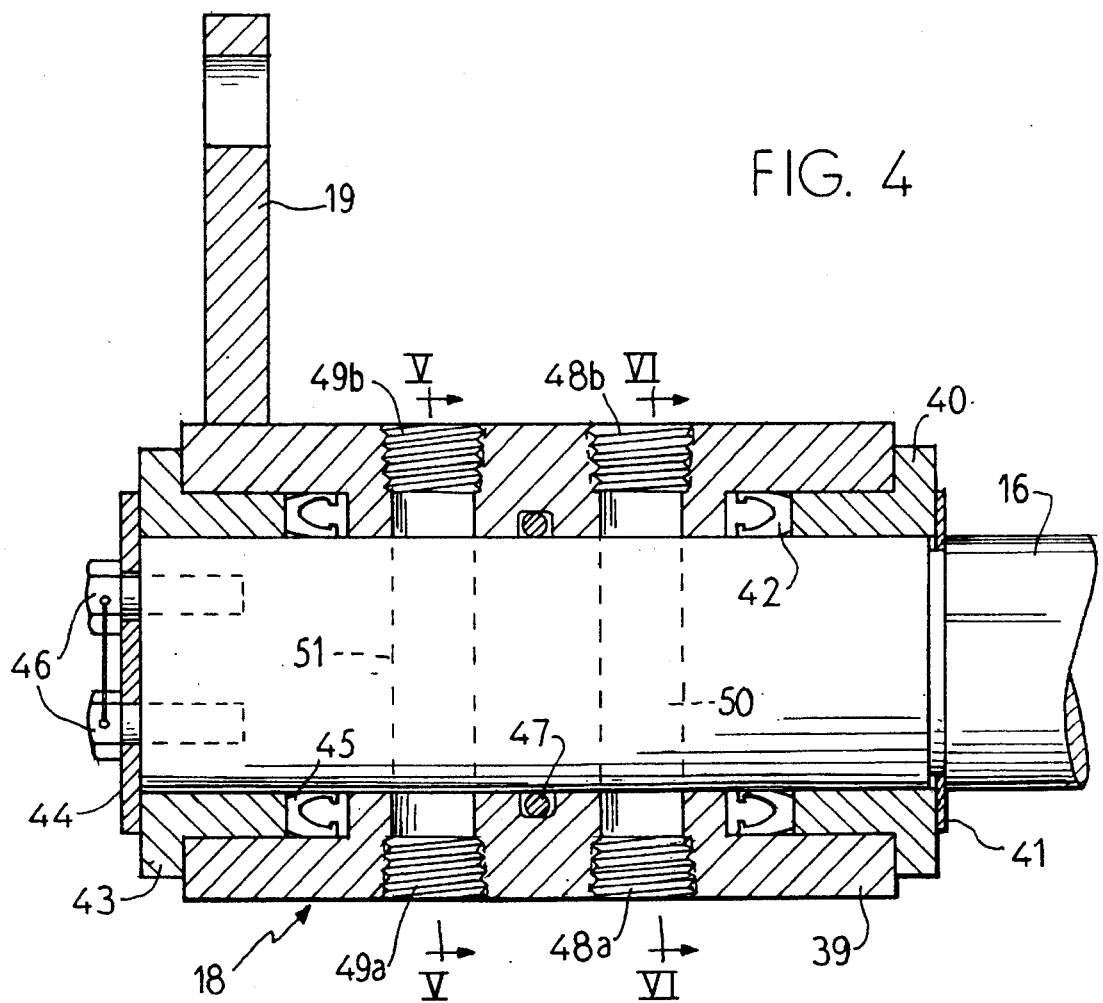
FIG. 4 is a cross-sectional view of the rotary control valve used in the self-loading controlled deflection roll constructed and operating in accordance with the principles of the present invention.

In accordance with the principles of the present invention, the movement of these components, in response to the respective displacements of the shoes 14 and 15, is used to control the delivery of oil to the respective chambers for the shoes 14 and 15, so that the shoes 14 and 15 move toward and away from the roll shell 10 in a uniform, even manner. This is accomplished by a mechanical control system, which includes a control valve 18 disposed at one end of a cross shaft 16 extending in the cross-machine direction substantially parallel to the center shaft 8. The cross shaft 16 is rotatably held in a plurality of mounts 17, which may be attached to the center shaft 8. As shown in further detail in FIG. 4, the control valve 18 has a hollow, cylindrical housing 39, which receives one end of the cross shaft 16 therein. The opposite ends of the housing 39 are closed by flanges 40 and 43, through which the cross shaft 16 also extends. The end face of the cross shaft 16 is bolted to face plate 44 by bolts 46. The shaft 16 has an annular groove therein disposed at the location at which the cross shaft 16 exits the flange 40, and a snap ring 41 is received in this groove. The flange 43 has an annular, deformable seal ring 45, which, due to its resiliency, is urged against the cross shaft 16 and the interior of the housing 39 to provide a seal. The flange 40 is provided with a similar ring 42. A center seal element 47 is also provided, disposed in an annular channel in the interior of the housing 39. The housing 39 is rigidly attached to the arm 26, so that the housing 39 is free to rotate around the cross shaft 16 when the arm 26 is moved by the link 19, due to rotation of the front bearing ring 20.

The housing 39 has two substantially parallel bores extending therethrough so as to provide ports 48a and 48b which are in registry, and ports 49a and 49b which are in registry. Each of the ports is threaded so as to facilitate connections to oil supply conduits. The cross shaft 16 has a bore 50 therein which is in fluid communication with and is relatively rotatable between the ports 48a and 48b. Similarly, in the cross shaft 16 is a bore 51 in fluid communication with and is relatively rotatable between the ports 49a and 49b.

Figure 3:
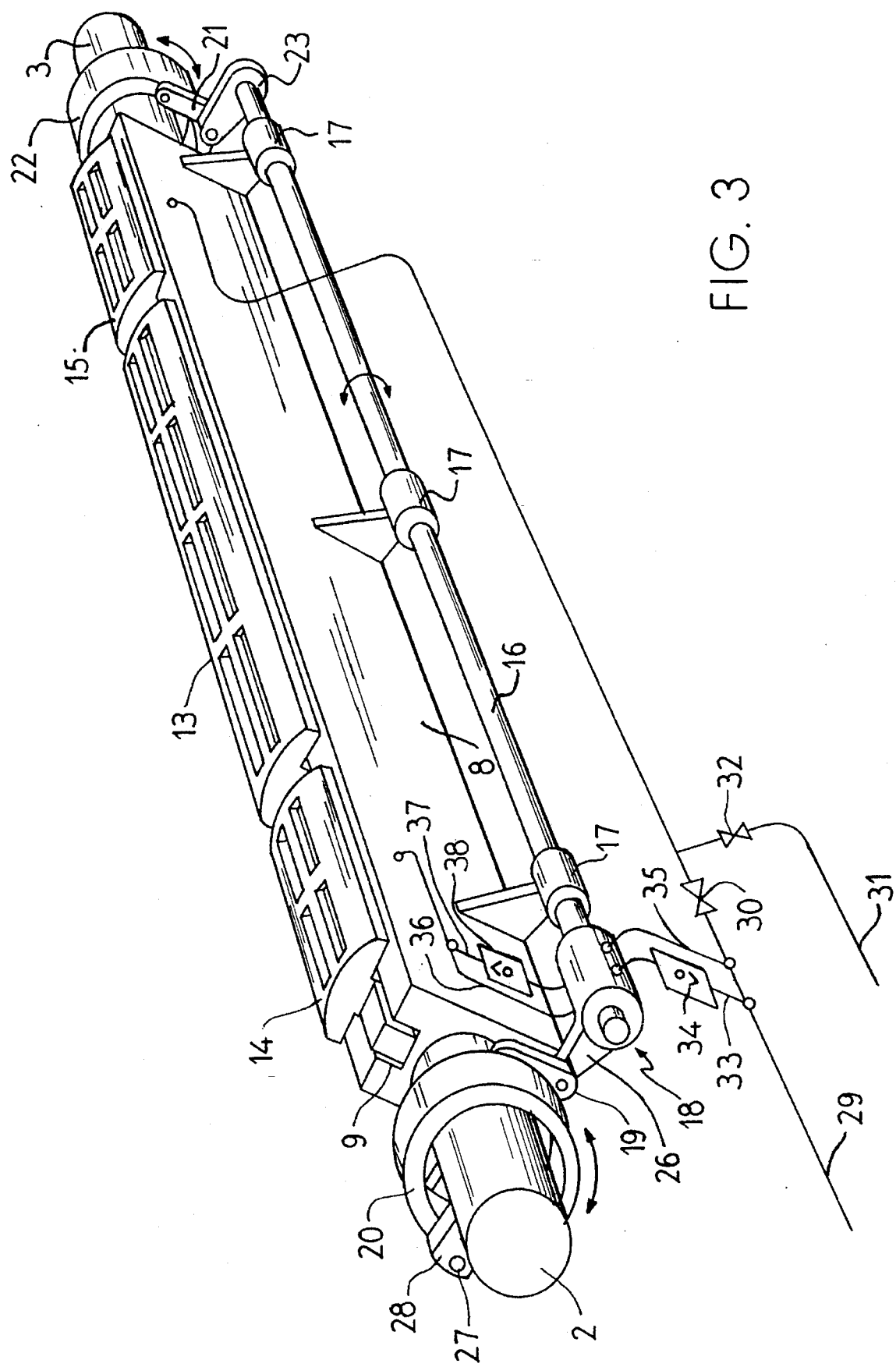
FIG. 3 is a diagrammatical, perspective view of the internal components of the self-loading controlled deflection roll of FIG. 1, with a schematically indicated oil delivery system.

As shown in FIG. 3, the roll is supplied with oil for hydraulically operating the front shoe 14 and the back shoe 15 via an oil supply line 29. The oil supply line 29 has a branch 33 with a one-way valve 34 therein which permits oil flow only in a direction from the line 29 to a port of the control valve 18. In the configuration of the hydraulic lines shown in FIG. 3, the line 33 will be connected to the port 49a. A line 36 is, in the configuration shown in FIG. 3, connected to the port 49b of the control valve 18, and leads directly to the cylinder (not shown) which operates the front shoe 14.

The supply line 29 has a further branch 35, which in the configuration shown in FIG. 3 is connected to the port 48a of the control valve 18. A line 37, which in the embodiment of FIG. 3 is connected to the port 48b, is also connected to the line 36 via a one-way valve 38, which permits oil flow only in a direction from the line 36 toward the control valve 18.

A back shoe pressure control line 31 is also provided, which is connected to the oil supply line 29 downstream of the connections to the control valve 18. The oil supply line 29 is provided with a valve 30, and the back shoe pressure control line 31 is provided with a valve 32. When lifting or retracting the shoes 14 and 15, the valve 30 is open and the valve 32 is closed, so that both shoes 14 and 15 are supplied with oil via the line 29, in the controlled manner described below. After a lifting or retracting operation has been completed, the shoes 14 and 15 are switched to separate pressure control, in order to maintain those shoes in a desired position, by closing the valve 30 and opening the valve 32, so that the front shoe 14 is supplied via the line 29, and the back shoe 15 is supplied via the line 31.

In summary, the control valve 18 operates so that if the front shoe 14 begins to lift faster than the back shoe 15, the front shoe oil supply will be restricted. Conversely, if the back shoe 15 begins to lift faster than the front shoe 14, the front shoe oil supply will be increased. This is accomplished by the control valve 18 and the aforementioned mechanical linkages between the housing 39 of the control valve 18 and the front bearing ring 20, and between the cross shaft 16 and the back bearing ring 22.

Figures 5, 6:
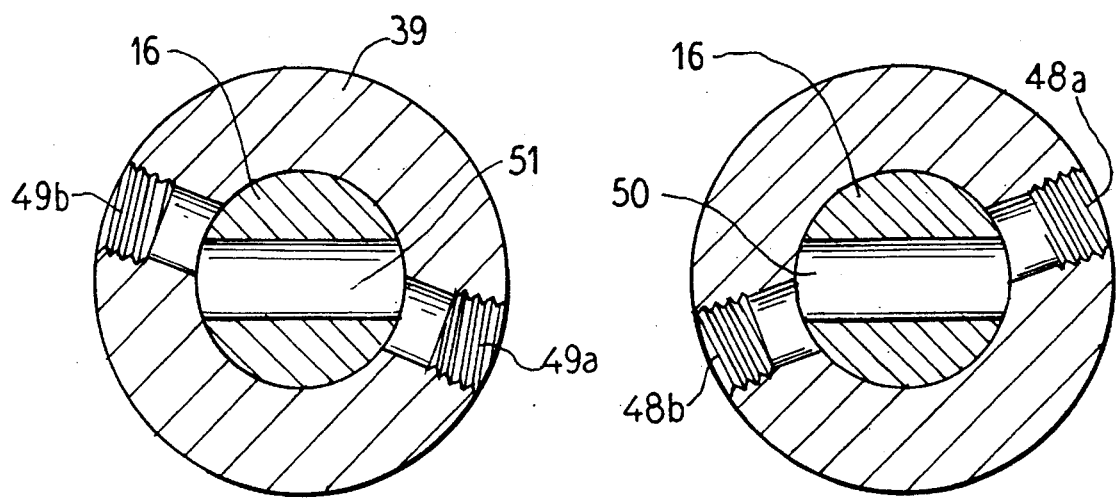
FIG. 5 is a sectional view of the rotary control valve of FIG. 4, taken along line V—V.
FIG. 6 is cross-sectional view of the rotary control valve shown in FIG. 4 taken along line VI—VI.

With the arrangement of the supply lines as shown in FIG. 3, the bore 51 in the cross shaft 16 forms a part of the supply line to the front shoe 14 for lifting, and the bore 50 controls the oil flow from the front shoe 14 for lowering (retraction). The flow passage which is used at any given time is governed by the check valves 34 and 38. The rate of flow through the passage in use is governed by the relative rotary position of the bore 51 or 50 in the cross shaft 16 with respect to the associated ports in the housing 39 of the control valve 18. As long as the front shoes 14 and 15 are being lifted evenly, the bearing rings 20 and 22 will rotate by the same amount, so that the cross shaft 16 and the control valve housing 39 also rotate by the same respective amounts, thereby keeping the bore currently in use in a midway position between its associated ports in the housing 39. If the front shoe 14, however, begins to lift faster than the back shoe 15, the front bearing ring 20 will rotate by a greater amount, and this increased rotation will be translated to the housing 39 via the link 19 and the arm 26. The "normal", midway relative position of the bore 51 with respect to the ports 49a and 49b is shown in FIG. 5, wherein it can be seen that the bore 51 is positioned approximately half way between the ports 49a and 49b. Therefore, relative rotation of the bore 51 and the ports 49a and 49b in one direction will increase the flow through the bore 51, whereas rotation in the opposite direction will decrease the flow. In the aforementioned circumstance wherein the front shoe 14 has begun to lift faster than the back shoe 15, the relative rotation will be such as to restrict the flow of oil through the bore 51 until the shoes 14 and 15 are again being lifted evenly.

Conversely, if the back shoe 15 begins to lift faster than the front shoe 14, the amount of rotation of the back bearing ring 22 will be larger than that of the front bearing ring 20. This increased rotation will be transferred to the cross shaft 16 via link 21, which is connected to the cross shaft, and the arm 23, which is fixed to the cross shaft 16 and connected to link 21, causing a relative rotation of the housing 39 with respect to the cross shaft 16 which increases the flow of oil through the bore 51, until the shoes 14 and 15 are again being lifted evenly.

The same operation takes place during retraction (lowering) of the shoes 14 and 15, except that, by virtue of the operation of the check valves 34 and 38, the flow takes place via lines 37 and 35 and through ports 48a and 48b and bore 50. FIG. 6 shows the "normal" orientation of the bore 50 relative to the ports 48a and 48b, and it can again be seen that relative rotation of the shaft 16 and the housing 39 in one direction will increase the flow through the bore 50, whereas rotation in the other direction will decrease the flow.

As is apparent from the above explanation it is important, when the end of the cross shaft 16 at the back shoe 15 is rotated by the arm 23, that this rotation be immediately transferred to the opposite end of the cross shaft 16 within the control valve 18, so that the necessary flow control can take place. Due to the extremely wide cross-machine extent of many papermaking machines today, the cross shaft 16 would not be able to immediately transmit this rotational motion from one end to the other (unless it had a relatively large diameter, in which case it would be undesirably space-consuming and heavy), because a certain amount of the motion would be lost due to torsion (twisting)of the cross shaft 16. This not only represents "lost" motion which would result in the end of the cross shaft 16 within the control valve 18 being rotated by a lesser amount than actually takes place at the opposite end of the cross shaft 16, but also represents a time delay, since there will be a certain amount of time lag as the cross shaft 16 responds to the torsion forces. In order to alleviate this situation, the cross shaft 16 can be provided with a timing coupling 24, as shown in FIG. 1. The timing coupling 24 divides the cross shaft 16 into two pieces. One piece has a splined end 25 which is received in a correspondingly profiled interior bore of the coupling 24. The two parts of the shaft 16 can thus be "pre-twisted" by twisting one or both of the pieces before the spline connection is made, so that the cross shaft 16 will no longer "absorb" torsion, and thus rotation at the end of the shaft 16 disposed at the back shoe 15 will be translated almost immediately to the opposite end of the cross shaft 16 within the control valve 18.

Although modifications and changes may be suggested by those skilled in the art, it is the intention of the inventors to embody within the patent warranted hereon all changes and modifications as reasonably and properly come within the scope of their contribution to the art.

We claim as our invention:

1. A self-loading controlled deflection roll for use with a source of hydraulic fluid, comprising:
   a hollow roll shell;
   a center shaft extending through said shell;
   a front shoe and a back shoe carried by said center shaft inside said roll shell to achieve uniform radial movement of the shoes, and thus uniform radial movement of the shell.
   hydraulic means, including a supply line connected to said source of hydraulic fluid and to said front and back shoes for simultaneously hydraulically displacing said front and back shoes relative to said shell;
   a first control element;
   a second control element engaging said first control element so that said first and second control elements are relatively movable;
   means mechanically connected to said first control element for moving said first control element by an amount corresponding to an extent of displacement of said front shoe;
   means mechanically connected to said second control element for moving said second control element by an amount corresponding to an extent of displacement of said back shoe; and
   said first and second control elements having respective passages in a control valve means disposed in said supply line for regulating supply of said hydraulic fluid to one of said front or back shoes dependent on the relative movement between said first and second control elements for maintaining an even displacement of said front and back shoes.

2. A self-loading controlled deflection roll as claimed in claim 1 wherein said control valve means comprises valve means for regulating supply of said hydraulic fluid to said front shoe.

3. A self-loading controlled deflection roll as claimed in claim 1 wherein said first control element comprises a hollow cylinder having two passages extending therethrough, and wherein said second control element comprises a cross shaft extending substantially parallel to said center shaft and having an end received in said hollow cylinder and having two passages therein in registry with said two passages in said hollow cylinder.

4. A self-loading controlled deflection roll as claimed in claim 3 wherein said means mechanically connected to said first control element comprises:
   a front bearing ring rotatable in a direction, and by an amount, corresponding to displacement of said front shoe;
   an arm attached to said hollow cylinder; and
   a linkage having a first end pivotably pinned to said front bearing ring and a second end pivotably pinned to said arm.

5. A self-loading controlled deflection roll as claimed in claim 3, wherein said means mechanically connected to said second control element comprises:
   a back bearing ring rotatable in a direction, and by an amount, corresponding to displacement of said back shoe;
   an arm attached to an end of said cross shaft opposite to said end received in said hollow cylinder; and
   a linkage having a first end pivotably pinned to said back bearing ring and a second end pivotably pinned to said arm.

6. A self-loading controlled deflection roll as claimed in claim 3 further comprising means for pre-twisting said cross shaft between said end received in said hollow cylinder and an opposite end of said cross shaft.

7. A self-loading controlled deflection roll as claimed in claim 1 wherein said passages in said control valve means comprise a first set of passages forming a first flow path through said control valve means and a second set of passages forming a second flow path through said control valve means, and wherein said self-loading controlled deflection roll further comprises:
   check valve means for automatically directing hydraulic fluid through said first flow path for lifting one of said front or back shoes regulated by said control valve means and for automatically directing hydraulic fluid through said second flow path for lowering said one of said front or back shoes regulated by said control valve means.

8. A self-loading controlled deflection roll for use with a source of hydraulic fluid, comprising:

a hollow roll shell;

a center shaft extending through said shell;

a front shoe and a back shoe carried by said center shaft inside said roll shell; to achieve uniform radial movement of the shoes, and thus uniform radial movement of the shell;

hydraulic means, including a supply line connected to said source of hydraulic fluid and to said front and back shoes for simultaneously hydraulically displacing said front and back shoes relative to said center shaft;

a cross shaft extending substantially parallel to said center shaft, and having an arm extending from one end thereof at said back shoe and having two openings in an opposite end thereof at said front shoe;

a back bearing ring rotatable in a direction and by an amount corresponding to displacement of said back shoe;

a first linkage having a first end pivotably pinned to said back bearing ring and a second end pivotably pinned to said arm, said cross shaft being rotated in an amount and direction corresponding to displacement of said back shoe by rotation of said back bearing ring being mechanically transmitted to said arm by said first linkage;

a hollow cylinder disposed at said front shoe and surrounding said end of said cross shaft having said openings therein, said hollow cylinder having two openings therein in registry with said two openings in said cross shaft, said hollow cylinder having an arm extending therefrom;

a front bearing ring rotatable in a direction and by an amount corresponding to displacement of said front shoe;

a second linkage having a first end pivotably pinned to said front bearing ring and a second end pivotably pinned to said arm of said hollow cylinder, said hollow cylinder being rotatable in a direction and an amount corresponding to displacement of said front shoe by rotation of said front bearing ring, the displacement being mechanically transmitted to said arm of said hollow cylinder by said second linkage; and said openings in said hollow cylinder being connected in said supply line in a control valve means for regulating supply of said hydraulic fluid to said front shoe dependent on the relative movement between said hollow cylinder and said cross shaft for maintaining an even displacement of said front shoe relative to said back shoe.

9. A self-loading controlled deflection roll as claimed in claim 8 wherein said openings in said control valve means comprise a first set of openings forming a first flow path through said control valve means and a second set of openings forming a second flow path through said control valve means, and wherein said self-loading controlled deflection roll further comprises:

check valve means for automatically directing hydraulic fluid through said first flow path for lifting one of said front or back shoes regulated by said valve control means and for automatically directing hydraulic fluid through said second flow path for lowering said one of said front or back shoes regulated by said control valve means.

10. A self-loading controlled deflection roll as claimed in claim 8 further comprising means for pre-twisting said cross shaft between said end received in said hollow cylinder and said end from which said arm extends.

11. A method for operating a self-loading controlled deflection roll comprising the steps of:

displaceably mounting a front shoe and a back shoe on a center shaft extending through a hollow roll shell;

simultaneously hydraulically displacing said front and back shoes relative to said shell to achieve uniform radial movement of the shoes, and thus uniform radial movement of the shell;

mechanically moving a first control element in a direction and by an amount corresponding to displacement of said front shoe;

mechanically moving a second control element in a direction and by an amount corresponding to displacement of said back shoe;

mechanically engaging said first and second control elements so that said first and second control elements are relatively movable;

establishing at least one flow path for hydraulic fluid between a source of hydraulic fluid and one of said front or back shoes dependent on the relative positions of said first and second control elements; and maintaining an even-displacement of said front and back shoes by regulating the at least one flow path of hydraulic fluid to one of said front or back shoes by varying a cross-section of said at least one flow path flow path by relatively moving said first and second control elements.

12. A method as claimed in claim 11 wherein the step of regulating the at least one flow path of hydraulic fluid is further defined by regulating the at least one flow path of hydraulic fluid to said front shoe.

13. A method as claimed in claim 11 wherein the step of establishing at least one flow path is further defined by establishing first and second flow paths, and comprising the additional step of:

automatically directing hydraulic fluid through said first flow path for lifting said one of said front or back shoes for which the at least one flow path of hydraulic fluid is regulated, and automatically directing hydraulic fluid through said second flow path for lowering said one of said front or back shoes for which said at least one flow path of hydraulic fluid is regulated.

14. A method as claimed in claim 11 wherein said first control element comprises a cross shaft extending between said back shoe and said front shoe, and wherein said method comprises the additional step of:

pre-twisting said cross shaft between said front and back shoes.

* * * * *